US011927244B2

(12) United States Patent
Tanaka et al.

(10) Patent No.: US 11,927,244 B2
(45) Date of Patent: Mar. 12, 2024

(54) CHAIN TRANSMISSION DEVICE

(71) Applicant: DAIDO KOGYO CO., LTD., Ishikawa (JP)

(72) Inventors: Motoki Tanaka, Ishikawa (JP); Satoshi Yamashita, Ishikawa (JP); Hiroki Nakagawa, Ishikawa (JP); Atsushi Hayashi, Ishikawa (JP)

(73) Assignee: DAIDO KOGYO CO., LTD., Ishikawa (JP)

( * ) Notice: Subject to any disclaimer, the term of this patent is extended or adjusted under 35 U.S.C. 154(b) by 290 days.

(21) Appl. No.: 17/479,672

(22) Filed: Sep. 20, 2021

(65) Prior Publication Data

US 2022/0003295 A1    Jan. 6, 2022

Related U.S. Application Data

(63) Continuation of application No. PCT/JP2019/012275, filed on Mar. 22, 2019.

(51) Int. Cl.
*F16G 13/04* (2006.01)
*F16H 7/06* (2006.01)
*F16H 57/05* (2006.01)

(52) U.S. Cl.
CPC ............. *F16G 13/04* (2013.01); *F16H 7/06* (2013.01); *F16H 57/05* (2013.01)

(58) Field of Classification Search
CPC .......... F16G 13/04; F16G 13/06; F16G 13/08; F16G 13/02; F16G 15/12; F16H 7/06; F16H 57/05
USPC .......................................................... 474/91
See application file for complete search history.

(56) References Cited

U.S. PATENT DOCUMENTS

| | | | | |
|---|---|---|---|---|
| 4,509,937 A * | 4/1985 | Ledvina | ................... | F16G 13/04 474/213 |
| 4,758,209 A * | 7/1988 | Ledvina | ................... | F16H 55/30 474/212 |
| 5,967,926 A * | 10/1999 | Kozakura | ............... | F16G 13/04 474/213 |
| 6,068,568 A | 5/2000 | Kozakura et al. | | |
| 7,419,449 B2 * | 9/2008 | Tohara | .................... | F16G 13/06 474/212 |

(Continued)

FOREIGN PATENT DOCUMENTS

| | | |
|---|---|---|
| CN | 101109424 | 1/2008 |
| DE | 197 54 489 | 8/2007 |

(Continued)

OTHER PUBLICATIONS

International Search Report dated Jun. 25, 2019 in International (PCT) Application No. PCT/JP2019/012275.

*Primary Examiner* — Henry Y Liu
(74) *Attorney, Agent, or Firm* — Wenderoth, Lind & Ponack, L.L.P.

(57) ABSTRACT

When a contact area with a chain guide is reduced by a back surface of a link plate having a convex portion, a friction coefficient in a fluid lubrication region is reduced. A coating film containing 10% or more of chromium is on the link plate. A friction modifier made of a molybdenum compound and including with a lubricating oil promotes generation of $MoS_2$ by the coating film, and prevents an increase in a friction coefficient in a boundary lubrication region.

13 Claims, 11 Drawing Sheets

(56) References Cited

U.S. PATENT DOCUMENTS

| | | | | |
|---|---|---|---|---|
| 7,585,239 B2* | 9/2009 | Miyazawa | F16G 13/06 474/155 |
| 7,837,583 B2* | 11/2010 | Tohara | F16G 13/08 474/201 |
| 8,771,117 B2* | 7/2014 | Yokoyama | F16H 7/06 474/91 |
| 8,979,691 B2* | 3/2015 | Tokita | F16G 13/04 474/212 |
| 9,109,657 B2* | 8/2015 | Bodensteiner | F16H 7/06 |
| 9,109,658 B2* | 8/2015 | Yoshida | F16G 13/08 |
| 2002/0031687 A1* | 3/2002 | Wang | F16G 13/06 427/242 |
| 2002/0049107 A1 | 4/2002 | Ledvina | |
| 2003/0087747 A1* | 5/2003 | Nagai | F16G 13/04 501/87 |
| 2003/0177752 A1* | 9/2003 | Nakagawa | B21L 9/065 59/5 |
| 2005/0130779 A1* | 6/2005 | Sudo | F01L 1/02 474/212 |
| 2007/0072719 A1* | 3/2007 | Sakamoto | F16G 13/04 474/212 |
| 2008/0273827 A1* | 11/2008 | Fujiwara | C23C 8/22 384/625 |
| 2008/0300079 A1* | 12/2008 | Botez | F16G 13/04 474/213 |
| 2009/0042683 A1* | 2/2009 | Tohara | F16G 13/08 474/213 |
| 2010/0040905 A1* | 2/2010 | Fukuike | C09C 3/08 106/404 |
| 2011/0224041 A1* | 9/2011 | Tokita | F16G 13/04 474/213 |
| 2011/0287883 A1* | 11/2011 | Ritz | F16G 13/04 474/213 |
| 2012/0157252 A1* | 6/2012 | Yoshida | F16G 13/04 474/213 |
| 2013/0053194 A1* | 2/2013 | Yokoyama | F16G 13/06 474/91 |
| 2013/0059691 A1* | 3/2013 | Miyanaga | F16G 13/06 474/214 |
| 2013/0196804 A1* | 8/2013 | Bodensteiner | F16G 13/02 474/148 |
| 2013/0267364 A1* | 10/2013 | Motoshima | F16G 13/04 474/213 |
| 2013/0274161 A1* | 10/2013 | Woodward | C10M 161/00 508/306 |
| 2015/0236281 A1* | 8/2015 | Yahagi | H10K 10/471 523/456 |
| 2016/0003324 A1* | 1/2016 | Yoshida | F16G 15/12 148/209 |
| 2016/0153525 A1* | 6/2016 | Eda | C21D 1/22 148/333 |
| 2016/0348755 A1* | 12/2016 | Ritz | F16G 13/06 |
| 2017/0058997 A1* | 3/2017 | Asada | F16G 13/04 |
| 2018/0065269 A1* | 3/2018 | Ståhlkrantz | B27B 17/02 |
| 2018/0298302 A1* | 10/2018 | Gooding | C10M 169/04 |
| 2018/0346839 A1* | 12/2018 | Fletcher | C10M 159/22 |
| 2019/0127654 A1* | 5/2019 | Pelligra | C10M 129/34 |
| 2019/0211415 A1* | 7/2019 | Wang | C22C 38/02 |

FOREIGN PATENT DOCUMENTS

| | | |
|---|---|---|
| JP | 60-81538 | 5/1985 |
| JP | 11-182634 | 7/1999 |
| JP | 2002-81508 | 3/2002 |
| JP | 2007-107583 | 4/2007 |
| JP | 2008-25744 | 2/2008 |
| JP | 2009-162377 | 7/2009 |
| JP | 2010-1975 | 1/2010 |
| JP | 5421448 | 11/2013 |
| JP | 2014-105717 | 6/2014 |
| JP | 2018-123937 | 8/2018 |

* cited by examiner

CHAIN TRANSMISSION DEVICE

CROSS-REFERENCE TO RELATED APPLICATIONS

This application is a Continuation of International Patent Application No. PCT/JP2019/012275, filed Mar. 22, 2019, which is hereby incorporated by reference herein in its entirety.

BACKGROUND OF THE INVENTION

Field of the Invention

The present invention relates to a chain transmission device in which a back surface of a chain is guided by a chain guide under a lubricating environment, and more particularly, to a chain transmission device suitable for application to a chain transmission device in an engine.

Background Art

In general, in a timing chain transmission device that transmits rotation of a crankshaft of an engine to a camshaft, a back surface of a chain is guided by a chain guide. When a silent chain is used as the chain, a back surface of an inner (toothed) link plate of the silent chain is a linear flat surface, and the entire back surface is in sliding contact with the chain guide. Thus, a friction loss increases and a gap may be defined between a back surface of a guide link plate and a guide surface of the chain guide, which may cause unstable behaviors of the chain.

In the related art, the applicant of the invention has devised a chain transmission device in which a back surface of a toothed link plate is a convex portion having a round shape, an ear (abutting) portion is formed on a pin back surface portion of a guide link plate, a top portion of the convex portion of the toothed link plate and a top portion of the ear portion of the guide link plate abut on a chain guide, the top portion of the convex portion and the top portion of the ear portion are formed at intervals of one pitch so as to be shifted by a half pitch, so that a contact area between the back surface of the link plate and the chain guide is reduced, and the chain is stably guided (see JP-A-2014-105717).

Although an in-engine chain transmission device such as a timing chain transmits power via a lubricating oil, in order to improve fuel efficiency, a lubricating oil having a low viscous resistance tends to be used. In particular, when the contact area between the back surface of the link plate and the chain guide is small, there is a possibility that oil film shortage occurs particularly in the small contact area part depending on a use state of the engine. For this reason, boundary lubrication may occur and the friction loss may increase on the contrary.

SUMMARY OF THE INVENTION

Accordingly, the present invention provides a chain transmission device in which a contact area between a back surface of a link plate of a chain and a chain guide is small to reduce a frictional resistance, and in which an increase in the frictional resistance is prevented even in boundary lubrication by matching a friction modifier added to a lubricating oil with a material of the link plate.

Solution to Problem

According to an aspect of the invention, there is provided a chain transmission device (1) including a chain (6 . . . ) wound around a plurality of sprockets (2, 3, 5) under a lubricating environment, the chain including outer links (19, 49) each including a plurality of link plates ($16_1$, 17, 47) fitted to pins (15, 45) without rotating relative to the pins (15, 45) and inner links (18, 48) each including a plurality of link plates ($16_2$, 46) fitted to the pins and being rotatable relative to the pins, the outer links and the inner links being alternately coupled in an endless manner, back surfaces of the link plates being guided by being in sliding contact with a chain guide (7, 9, 10).

The lubricating environment is an environment in which a friction modifier containing a molybdenum compound is added to a lubricating oil.

An area of each link plate in sliding contact with the chain guide is a small area of 50% or less of an overall area of the link plate on a back surface side.

At least a sliding contact portion of the link plate in sliding contact with the chain guide has a coating film containing 10% or more of a chromium component.

For example, with reference to FIGS. 2A to 3B, each outer link (19) includes a guide link plate (17) to which a pair of pins (15) are fixed, and a toothed link plate ($16_1$) disposed in the same row as the guide link plate and having a pair of teeth (20) on an inner diameter side. Each inner link (18) includes a toothed link plate ($16_2$) rotatably coupled to the pins (15) and having a pair of teeth (20) on an inner diameter side.

The chain is a silent chain ($6_1$) in which the outer links (19) (G) and the inner links (18) (N) are alternately coupled to each other in an endless manner.

For example, with reference to FIGS. 8A to 8C, each outer link (49) includes an outer link plate (47) to which a pair of pins (45) are fixed.

Each inner link (48) includes an inner link plate (46) to which a pair of bushings (50) are fixed.

The chain is a roller chain ($6_2$) in which the outer links (49) and the inner links (48) are alternately coupled to each other in an endless manner by fitting the pins (45) into the bushings (50).

For example, with reference to FIGS. 2A to 4, in the silent chain ($6_1$), the guide link plate (17) includes a crotch portion (27) on the back surface side and an ear portion (29) on each side of the crotch portion in a longitudinal direction.

A back surface of each of the toothed link plates (16, $16_1$, $16_2$) of the outer link (19) and the inner link (18) includes a convex portion (25) in a round shape.

Each of a top portion (30) of the ear portion of the guide link plate and a top portion of the convex portion (25) of the toothed link plate (16) defines the small area (A, B) in sliding contact with the chain guide (7).

In the silent chain ($6_1$), at least one of the toothed link plate (16) of the outer link (19) and the toothed link plate (16) of the inner link (18) has a convex portion (25) in a round shape on a back surface thereof.

A top portion of the convex portion (25) of the toothed link plate (16) defines the small area in sliding contact with the chain guide (7).

For example, with reference to FIGS. 8A to 8C, in the roller chain ($6_2$), the outer link plate (47) has a convex portion (55) in a round shape on a back surface thereof.

The inner link plate (46) has a convex portion (59) in a round shape on a back surface thereof.

Each of a top portion of the convex portion (55) of the outer link plate (47) and a top portion of the convex portion (59) of the inner link plate (46) defines the small area in sliding contact with the chain guide.

For example, with reference to FIGS. 9A and 9B, in the roller chain ($6_3$), the outer link plate ($47_3$) has a first height (Ho) from a pitch line to a back surface.

The inner link plate ($46_3$) has a second height (Hi) from a pitch line (L-L) to a back surface.

One of the first height (Ho) of the outer link plate and the second height (Hi) of the inner link plate is larger than the other, and only the outer link plate or the inner link plate that has the larger height is brought into sliding contact with the chain guide to defines the small area.

For example, with reference to FIGS. 10A and 10B, in the silent chain ($6_4$), the guide link plate ($17_4$) has a predetermined height (Ho) from a pitch line (L-L) to a back surface. The toothed link plate ($16_4$) of the outer link (G) and the toothed link plate ($16_4$) of the inner link (N) have a predetermined height (Hi) from a pitch line (L-L) to respective back surfaces. A height (Ho) of the guide link plate ($17_4$) is larger than a height (Hi) of the toothed link plate ($16_4$), and only the guide link plate ($17_4$) defines the small area by being in sliding contact with the chain guide.

For example, with reference to FIGS. 11A and 11B, in the silent chain ($6_5$), the guide link plate ($17_5$) has a predetermined height (Ho) from a pitch line to a back surface. The toothed link plate ($16_51$) of the inner link (N) and the toothed link plate ($16_52$) of the outer link (G) have different heights from a pitch line to respective back surfaces.

The higher one ($16_51$) of the toothed link plate of the inner link and the toothed link plate of the outer link has a larger height than those of the lower toothed link plate ($16_52$) and the guide link plate ($17_5$), and only the higher one ($16_51$) of the toothed link plate of the inner link and the toothed link plate of the outer link defines the small area by being brought into sliding contact with the chain guide.

A hardness of the coating film is 600 Hv or more, and a thickness of the coating film is 3 μm or more.

A surface roughness of the coating film is Ra 0.5 or less.

The reference numerals in the parentheses are for comparison with the drawings, and do not have any effect on configurations described in the claims.

Further features of the present invention will become apparent from the following description of exemplary embodiments with reference to the attached drawings. In the accompanying drawings, the same or similar components are denoted by the same reference numerals.

DESCRIPTION OF THE EMBODIMENTS

Figure 1:
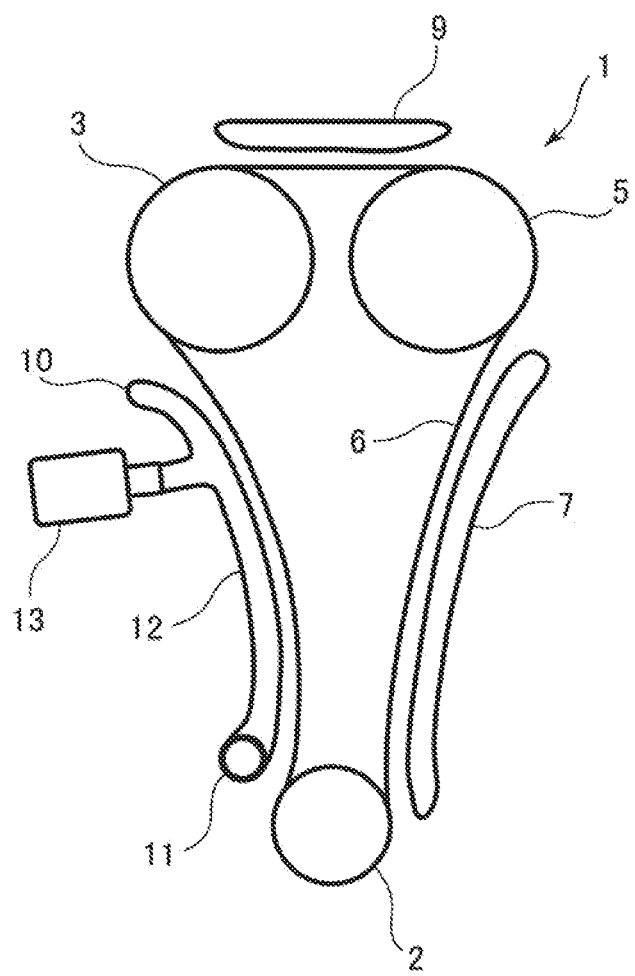
FIG. 1 is a schematic front view showing a timing chain transmission device according to an embodiment.

Hereinafter, embodiments of the invention will be described with reference to the drawings. FIG. 1 shows a timing chain transmission device 1 to which the invention can be applied. The timing chain transmission device 1 is disposed in an engine and used under a lubricating environment. The timing chain transmission device 1 includes a drive side sprocket 2 fixed to a crankshaft, driven side sprockets 3, 5 respectively fixed to two camshafts, and a chain 6 wound among the drive side sprocket 2 and the driven side sprockets 3, 5. Chain guides 7, 9, 10 are in sliding contact with a back surface side of the chain 6 to guide the chain. The chain guide 7 on a tension side between the drive side sprocket 2 and the driven side sprocket 5 and the chain guide 9 between the two driven side sprockets 3, 5 are formed of rail-shaped shoe members attached to fixing members. The chain guide 10 between the drive side sprocket 2 and the driven side sprocket 3 is formed of a chain tensioner. The chain guide 10 includes a shoe member 12 that is in sliding contact with a back surface of the chain and is swingably supported by a pivot pin 11, and an adjustment member 13 that adjusts the shoe member in accordance with a tension of the chain by an oil pressure or a spring.

The shoe members 7, 9, 10 serving as the chain guides are preferably made of a synthetic resin having a high wear resistance and a smooth surface with a small friction coefficient. Alternatively, the shoe members are not limited thereto and may be made of another material such as metal or rubber. The chain 6 may be a silent chain or a roller chain (including a bushing chain).

Figure 2A:
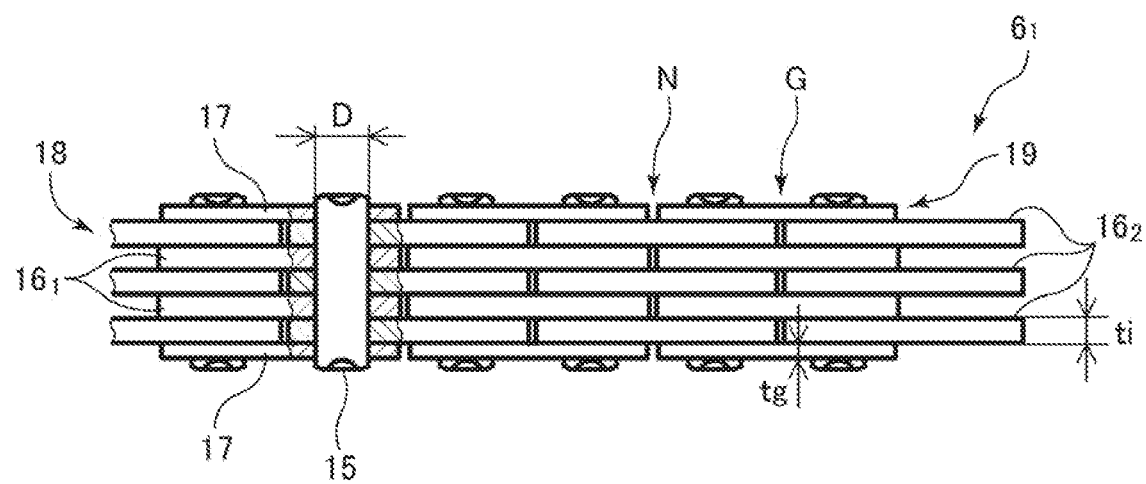
FIG. 2A is a cross-sectional plan view of a part of a silent chain.
Figure 2B:
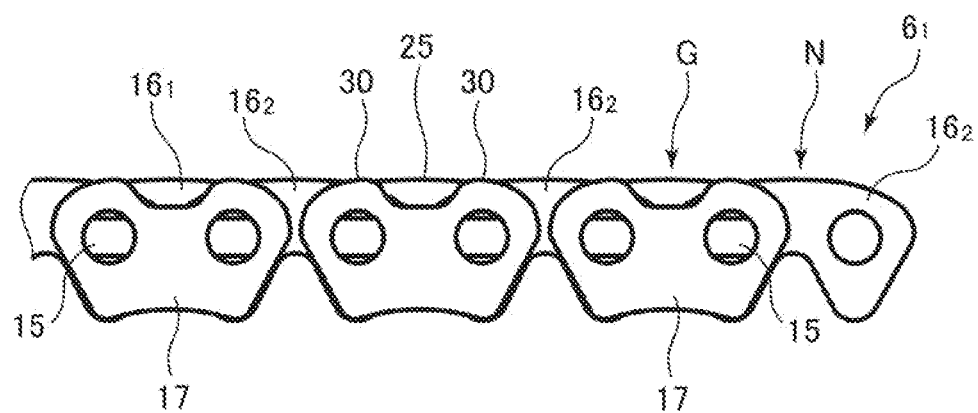
FIG. 2B is a front view of the silent chain.

An embodiment in which the silent chain is applied as the chain 6 will be described. As shown in FIGS. 2A and 2B, a silent chain $6_1$ is formed by alternately coupling toothed link plates 16 ($16_1$, $16_2$) with pins 15 in an endless manner. Guide link plates 17 are disposed on both outermost sides of a link row (lateral row) of the toothed link plates 16. The pins 15 are fixed to left and right guide link plates 17, 17 by crimping, interference fitting, or the like. Therefore, a guide row (outer link) G having the guide link plates include the toothed link plates $16_1$ and does not rotate with respect to the pins 15, and the toothed link plates $16_2$ of a non-guide row (inner link) N adjacent to the guide row rotate with respect to the pins 15, so that the silent chain $6_1$ can be freely bent, That is, the silent chain $6_1$ includes an outer link 19, which includes a pair of guide link plates 17 fixed by the pins 15 and the toothed link plates $16_1$ that are disposed in the same row as the guide link plates 17 and fitted to and do not rotate with respect to the pins 15, and an inner link 18. Which includes the toothed link plates $16_2$ that are fitted to and rotatable with respect to the pins 15. The silent chain $6_1$ is formed by alternately coupling the outer link (guide row G) 19 and the inner link (none-guide row N) 18 in an endless manner.

Figure 3A:
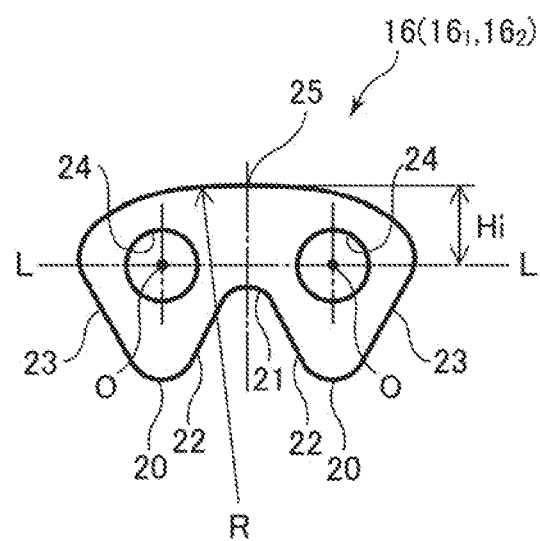
FIG. 3A is a front view of a toothed link plate.

As shown in FIG. 3A, the toothed link plate 16 ($16_1$, $16_2$) has a pair of left and right pin holes 24, 24, and a pair of teeth 20, 20 on a front side that is an inner diameter side of a line L-L (hereinafter referred to as a pitch line) connecting centers O, O of these pin holes, Inner flank surfaces 22, 22 are formed on a crotch portion 21 side between the teeth 20, and outer flank surfaces 23, 23 are formed on outer sides of each of the teeth 20. The teeth 20 constitute an engagement mechanism in which the inner flank surfaces 22 and the outer flank surfaces 23 are joined to sprocket teeth. For example, the inner flank surfaces 22 are first joined to the sprocket teeth to perform engagement, and then the outer flank surfaces 23 are seated on the sprocket teeth (inner flank contact, outer flank seating).

A back surface side of the toothed link plate 16, which is an outer diameter side of the pitch line, is formed in a round shape with a predetermined radius R. Therefore, a center portion in the middle between the left and right pin holes 24, 24 constitutes a convex portion 25 that is highest. A length (height) Hi from the pitch line L-L to a top portion of the convex portion 25 in the highest middle is set to a predetermined value. The hack surface side R is preferably set between 3P and 16P in which a pitch P is a pin hole interval. Further, a round shape side end surface including the top portion of the convex portion 25 is precisely finished by grinding processing and polishing processing with high accuracy (for example, Ra 0.05 to 0.5).

Figure 3B:
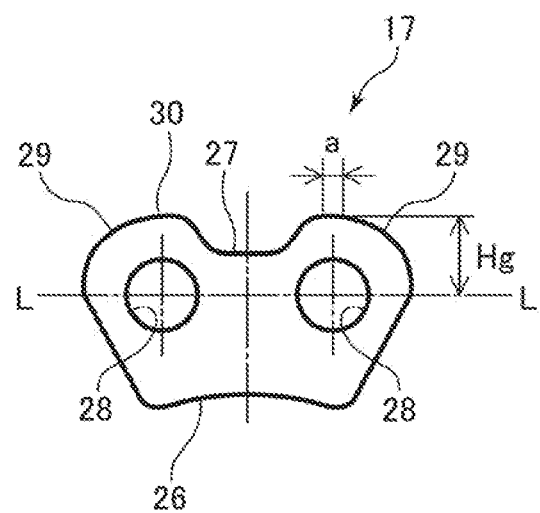
FIG. 3B is a front view of a guide link plate.

As shown in FIG. 3B, the guide link plate 17 has a pair of pin holes 28, 28. The inner diameter side (front side) of the pitch line L-L abuts against a side surface of the sprocket teeth to prevent lateral movement of the silent chain $6_1$, and an inner diameter end of the guide link plate 17 is formed in a concave round shape 26. A back surface of the guide link plate 17, which is the outer diameter side of the pitch line L-L, is of a type having a low rigidity in which a center portion constitutes a shallow crotch portion 27. Ear portions (abutting portions) 29, 29 are formed at on back surface side portions at positions corresponding to the outer diameter side of the pin holes 28, 28 in front of and behind (two sides in a longitudinal direction) the crotch portion 27. The ear portion 29 has a round shape on a whole, and a top portion 30 of the ear portion farthest from the pitch line L-L is formed of a straight flat surface parallel to the round shape or the pitch line L-L. When the top portion 30 of the ear portion is formed of the flat surface located at a position corresponding to the pin hole 28, a length a of the top portion 30 is smaller than a diameter D of the pin 15, and is preferably within a range of 0.1 D to 0.4 D with respect to the pin diameter D.

A length (height) Hg from the pitch line L-L to the top portion 30 of the ear portion 29 is set to be substantially equal to the length (height) Hi from the pitch line L-L to the top portion of the convex portion 25 on the back surface of the toothed link plate 16 (Hi=Hg). The term "substantially equal" means that the back surfaces of the toothed link plate 16 and the guide link plate 17 are in contact with the chain guide at the same time, and a difference of about half of a clearance due to a loose-fitting relationship between the pin holes 24 of the toothed link plate 16 and the pins 15 is included in a substantially equal range.

The top portion 30 of the ear portion is also grinded and polished to be finished with high accuracy, and may have a roughness the same as or lower than a roughness of the finished surface of the back surface (25) of the toothed link plate 16.

As shown in FIG. 2A, in the silent chain $6_1$, a plate thickness tg of the guide link plate 17 is set to be smaller than a plate thickness ti of the toothed link plate 16 (tg<ti). For example, the plate thickness tg of the guide link plate 17 is preferably in a range of 0.3 to 0.7 (tg=0.3 ti to 0.7 ti) with respect to the plate thickness ti of the toothed link plate 16. After assembly of the silent chain $6_1$ is completed, the silent chain $6_1$ is pulled with a tension equal to or greater than a yield load, and a preload operation is performed to absorb an initial elongation and align pitches. At this time, although the guide link row G (outer link 19) has one more single link plate than the non-guide link row N (inner link 18), a difference in the plate thickness cooperates with a shape of the low rigidity guide link plate 17 having the crotch portion 27, and all the toothed link plates 16 have substantially the same stress, so that pitch accuracy can be improved and deterioration of the pitch accuracy due to use can be reduced.

The silent chain $6_1$ constituting the timing chain transmission device 1 is guided such that a back surface thereof is in sliding contact with the chain guides 7, 9, 10. The surface in sliding contact with the top portion of the convex portion 25 of the toothed link plate 16 and the surface in sliding contact with the top portion 30 of the ear portion of the guide link plate 17 both have a small area. The small area is smaller than an area of the back surface side of the link plates 16, 17, that is, the area of the hack surface side of all the link plates between lines that are from the centers of the two pin holes 24, 24 and extend perpendicularly to the pitch line L-L, In the present embodiment, the small area is 10% or less of the area of the back surface side, and preferably 5% or less of the area of the back surface side.

At least a back surface portion (sliding contact portion) of each of the toothed link plate 16 and the guide link plate 17 that is in sliding contact with the chain guide includes a coating film containing 10% or more of a chromium component. For example, the link plates 16, 17 are made of a plate raw material of carbon steel or alloy steel containing a material C: 0.30 to 0.50 (wt %), for example, SCM-135 (chromium molybdenum steel), and are subjected to chromizing processing to diffuse and permeate a Cr carbide layer, which is a compound of Cr and C, into surfaces thereof. Alternatively, the link plates 16, 17 are made of a plate raw material of which a surface is plated with chromium. In either processing, the toothed link plate 16 and the guide link plate 17 are coated with the coating film containing 10% or more of chromium over the entire surface, and the coating film containing chromium has a thickness of 3 μm or more and a coating film hardness of 600 Hv or more. The surface roughness of at least the back surface portion (25, 30) in sliding contact with the chain guide is Ra 0.5 or less.

The timing chain transmission device 1 is disposed in an engine and used under a lubricating environment. The lubricating oil is an engine oil, and it is preferable to use a fuel-saving oil having a low viscosity. In order to prevent seizure or the like due to direct contact of engine components, the engine oil contains a friction modifier made of a molybdenum compound. Examples of the friction modifier include molybdenum dialkyldithiocarbamate and molybdenum dithiocarbamate (MoDTC), and molybdenum dithiophosphate (MoDTP).

The timing chain transmission device 1, which is a silent chain transmission device, reduces a speed of rotation of the drive side sprocket 2 driven by the crankshaft by half and transmits the rotation to the driven side sprockets 3, 5 to drive the two camshafts at appropriate timings. At this time, in order to prevent vibration or the like of the silent chain $6_1$ and stabilize a behavior of the chain, the back surface side of the chain is in sliding contact with the chain guides 7, 9, 10 via the engine oil, thereby stabilizing the chain traveling. In order to stabilize the behavior of the timing chain $6_1$, the chain is required to be appropriately in sliding contact with the chain guide, there is a demand for a reduction in a friction loss that affects fuel efficiency of automobiles, and the timing chain $6_1$ is required to have high durability and reliability since the chain is not replaced in principle until life of an automobile is reached.

Figure 4:
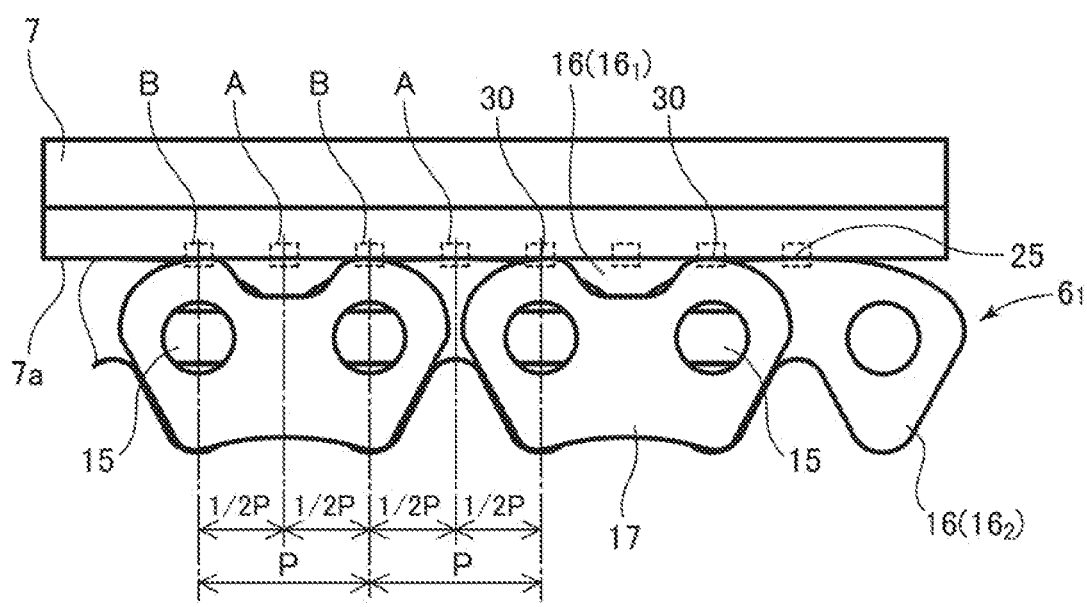
FIG. 4 is a front view showing an abutting state between the silent chain and a chain guide.

FIG. 4 shows a state in which the silent chain $6_1$ is in sliding contact with the chain guides 7, 9, 10. The chain guide 7 on the tension side is shown as a representative, and the same applies to the other chain guides 9, 10. In the silent chain $6_1$, the toothed link plate 16 is in contact with a guide surface 7a of the chain guide 7 at the top portion of the convex portion 25, and the guide link plate 17 is in contact with the guide surface 7a at the top portion 30 of the ear portion. The top portion of the convex portion 25 is at a center of one pitch P, which is the interval of the pins 15, and one top portion is provided for each toothed link plate 16. In the toothed link plate 16, the guide link row G (outer link 19) and the non-guide link row N (inner link 18) are alternately coupled, and thus one contact portion A of the top portion of the convex portion 25 is provided for each pitch P at the center portion of each pitch P in a side view There are two top portions 30 of the ear portions above the pins 15 with respect to each guide link plate 17, and are only in the guide link row G. Therefore, one contact portion B of the top portion 30 of the ear portion is provided for each pin (pitch) at each pitch P.

In the overall silent chain $6_1$, the contact portions A and B are located at ½ pitch intervals and are disposed at equal intervals (½ P) in a side view. The contact portions B defined by the top portions 30 of the ear portions of the guide link plates 17 are located at both ends of the silent chain $6_1$ in a width direction, and are shifted with respect to the contact portions A of the toothed link plates 16 by a half pitch for each pitch P, and thus a vibration of the chain in the width direction and a twisting direction is effectively prevented and the behavior of the silent chain is stabilized. As a result, the silent chain $6_1$ is appropriately engaged with the sprockets 2, 3, 5, engagement noise is reduced, and transmission efficiency and the durability are improved.

The above-described embodiment may use the guide link plate 17 not of a type having a low rigidity, and the back surface of the guide link plate 17 may be lower than the convex portion 25 of the toothed link plate 16, or use the guide link plate 17 of a type having a low rigidity and be used as a silent chain of which a height of the ear portion is lower than the convex portion. That is, at least one of the toothed link plate of the outer link and the toothed link plate of the inner link may be formed in a round convex shape, and a top portion of the convex portion of the toothed link plate may be in sliding contact with the chain guide. As a result, an area in sliding contact with the chain guide can be significantly reduced with a simple configuration.

Figure 5:
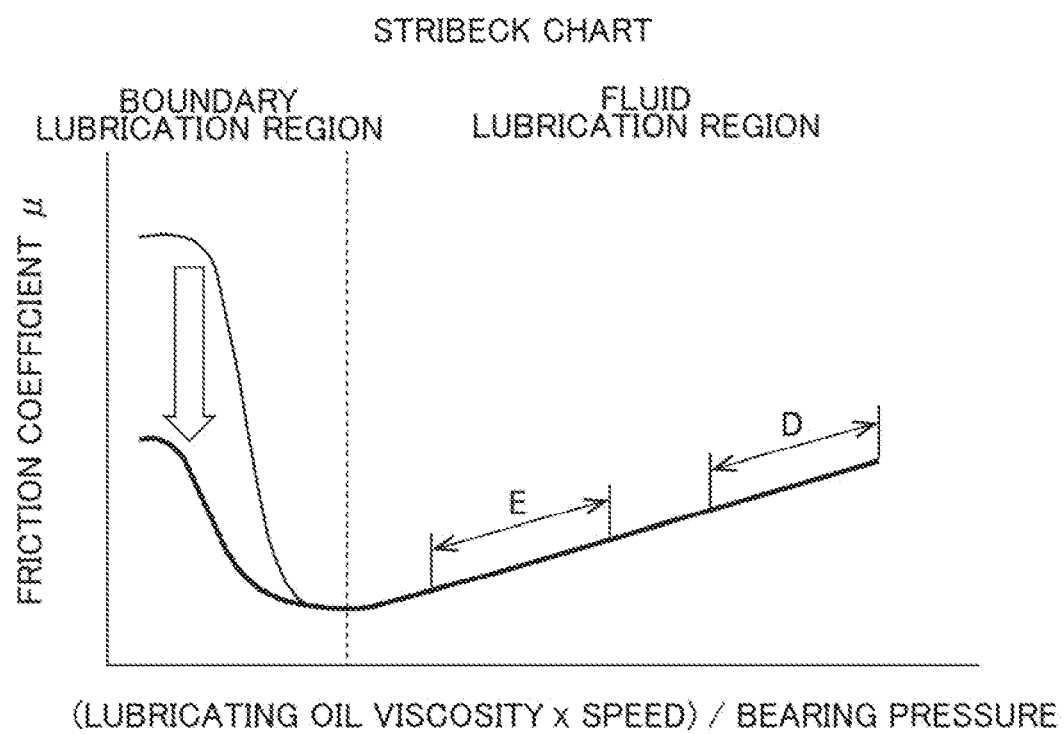
FIG. 5 is a Stribeck chart.

Therefore, as shown in FIG. 5, in a fluid lubrication region where the lubricating oil is interposed between the back surface of the silent chain $6_1$ and the chain guides 7, 9, 10, for example, when a back surface of a link plate is a straight line and a contact area with the chain guide is relatively large, the silent chain $6_1$ corresponds to a high region D having a high friction coefficient μ. In contrast, in the present embodiment in Which the small area (A, B) is defined by the top portion of the convex portion 25 and the top portion 30 of the ear portion, the silent chain $6_1$ corresponds to a low region E having a low friction coefficient μ, and the friction loss is small.

In contrast, when a viscous resistance of the lubricating oil is reduced to improve the fuel efficiency, particularly in a state where the chain back surface and the chain guide are in contact with each other with a small area as in the invention, the small area portion easily becomes a boundary lubrication region in which the oil runs out depending on a use state, and a large friction coefficient μ is obtained as shown by a thin line. Accordingly, as described above, the silent chain $6_1$ having excellent characteristics such as reduced friction loss in the fluid lubrication region is in the boundary lubrication region when the engine oil having low lubricating oil viscosity is used, the excellent characteristics cannot be maintained, and there is a concern that friction increases.

A friction modifier such as MoDTC is added to the engine oil. The McDTC is decomposed by sliding heat generation in the boundary lubrication region in the small area portion to form a coating film of molybdenum disulfide ($MoS_2$) on a sliding portion. The MoS2 coating film has a hexagonal layered crystal structure, and layers easily slide due to shearing, so that the $MoS_2$ coating film has a relatively low friction coefficient even when a fixing member is in direct contact with the $MoS_2$ coating film in an oil-cut state. Therefore, even in the boundary lubrication region due to the small area contact described above, it is possible to prevent seizure due to direct contact or to prevent a large increase in the friction loss. However, it is not possible to reduce the friction loss to a degree sufficient to correspond to the low friction region E having a small area in the fluid lubrication region.

At least a back surface portion of each of the toothed link plate 16 and the guide link plate 17 that is in sliding contact with the chain guide includes the coating film containing 10% or more of chromium. In the boundary lubrication region, sulfated molybdenum radicals are generated in the processing of the decomposition of MoDTC, and oxygen of the radicals is bonded at an interface of the chromium coating film. As a result, the radicals that lost oxygen become $MoS_2$, and quickly form a layered structure having multiple layers. That is, when the chromium coating film is formed on the link plates 16, 17, O is supplied to Cr in the boundary lubrication region in the processing of the decomposition of MoDTC, thereby promoting generation of $MoS_2$. Accordingly, as shown in the boundary lubrication region of FIG. 5, the friction coefficient μ greatly decreases as shown by a solid line (thick line), and corresponds to the low friction region F of the fluid lubrication region according to the present embodiment in which the contact area is small. Therefore, the silent chain $6_1$, which includes plates having a small contact area with the chain guide, has a low friction coefficient μ in the fluid lubrication region, so that the friction loss can be reduced and the boundary lubrication region is likely to be moved into due to the contact with the small contact area. Even in the boundary lubrication region, the friction modifier that is made of a molybdenum compound such as MoDTC and mixed in the engine oil cooperates with the chromium coating film of the link plate, so that the friction coefficient μ can be maintained at a sufficiently low value.

Figure 6A:
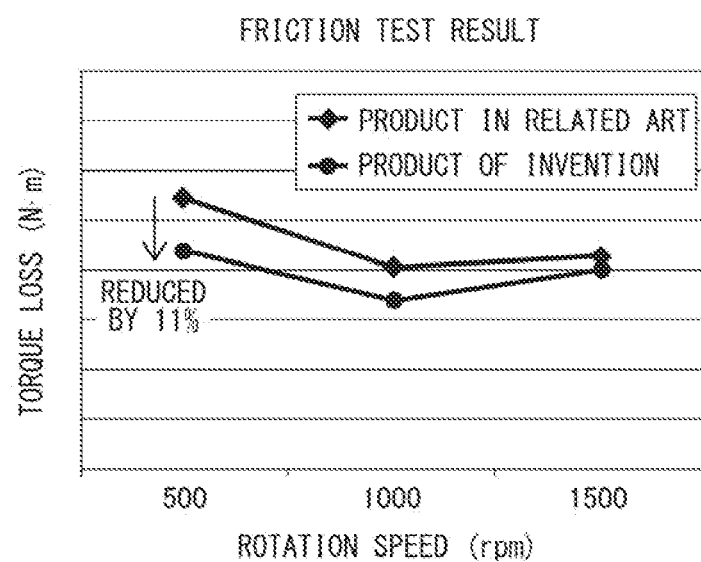
FIG. 6A is a diagram showing results of friction tests.
Figure 6B:
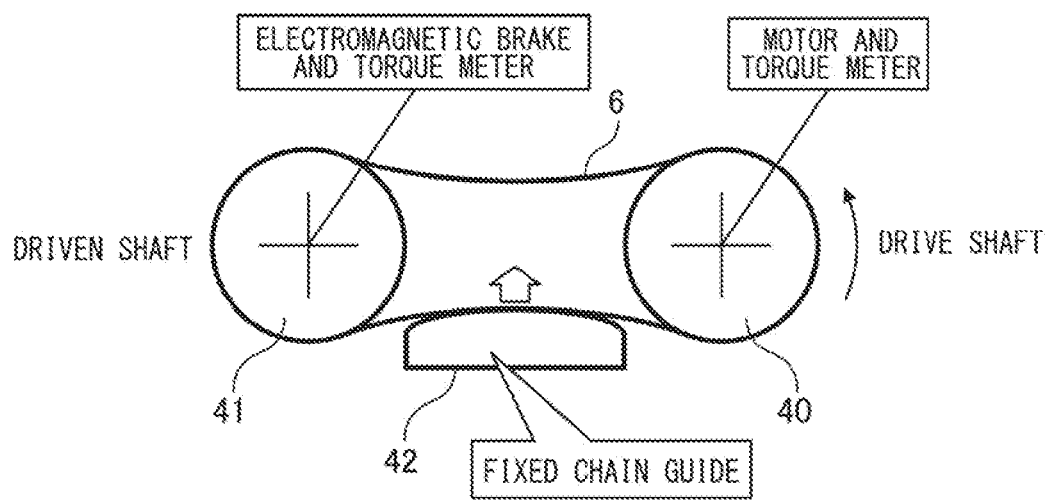
FIG. 6B is a diagram showing a testing device of the friction tests of FIG. 6A.

Next, a performance test of the friction loss of the silent chain will be described with reference to FIGS. 6A and 6B. In a friction loss tester, as shown in FIG. 6B, the silent chain 6 is wound between a drive side sprocket 40 attached to a drive shaft to which a motor and a torque meter are coupled and a driven side sprocket 41 attached to a driven shaft to which an electromagnetic brake and a torque meter are coupled, and a fixed chain guide 42 for guiding a back surface of the chain is provided on a tension side of the silent chain 6. The drive side sprocket 40 is rotated by the motor, and the driven side sprocket 41, to which a load is applied by the electromagnetic brake via the silent chain 6, is rotated. At this time, a sliding resistance is applied on the silent chain between the silent chain and the chain guide 42 disposed on the tension side of the chain, and a torque difference between both shafts is detected by the torque meters on the driving side and the driven side, so that the torque difference is measured as the friction loss.

By using the friction loss tester, the silent chain $6_1$ according to the invention having the same size (pitch P=6.35 mm) was compared with a silent chain (product in the related art) including toothed link plates and guide link plates that have the same shape and small areas on back surfaces thereof and having no chromium coaling film formed on the surfaces thereof. Test conditions include a chain tension of 500 [N], a rotation speed of 500 to 1500 [rpm], a fixed guide (chain guide) of PA66 nylon, and a lubricating engine oil of 0 W to 20 W and a roughness of the back surface and the like of each link plate are finished with high accuracy to the same degree. As shown in FIG. 6A, a result of the test observed that the friction loss of the silent chain according to the invention was reduced by about 11% compared to the silent chain in the related art.

Figure 7:
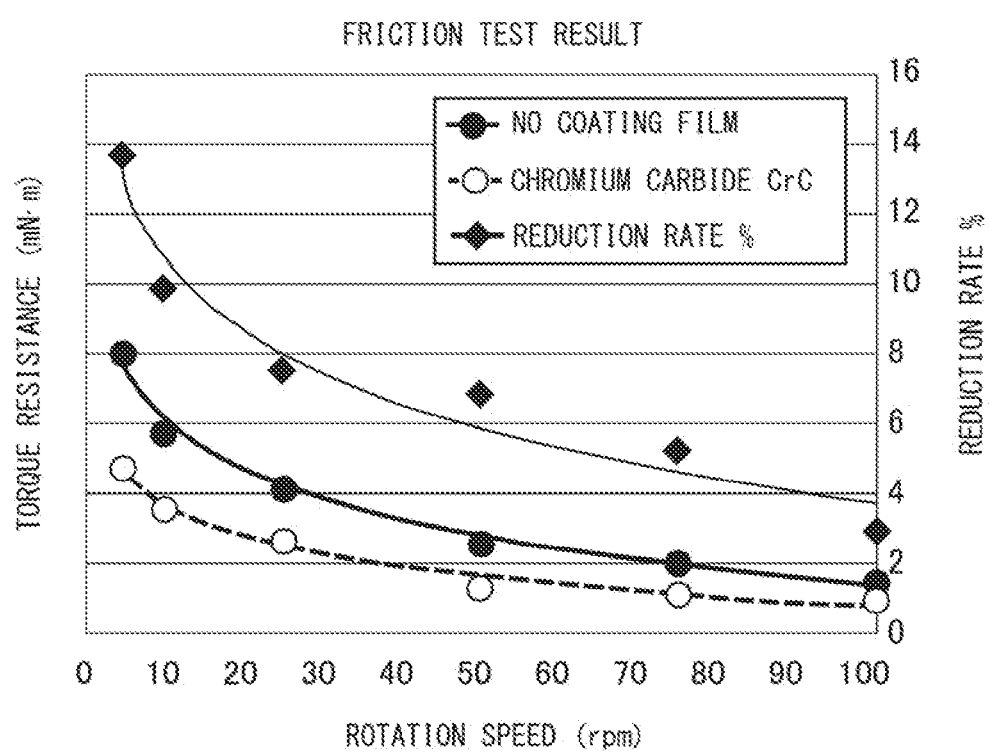
FIG. 7 is a diagram comparing sliding resistances of a chain having a coating film according to the invention and a chain having no coating film.

FIG. 7 shows results of measuring a torque resistance by pressing a toothed link plate having a chromium carbide (CrC) coating film on a surface thereof by being subjected to chromizing processing and a toothed link plate of the related art having no chromium coating film against a rotating plate. Test conditions include using toothed link plates having the same shape (in this test, a type in the related art that has a linear back surface is used), a constant pressing load of 0.75 [kg], a rotation speed of 5 to 100 [rpm], a disc (rotating plate outer peripheral surface) of PA66 nylon, and a lubricating engine oil of 0 W to 20 W. With respect to an inner link plate (black circle) without the chromium coating film, the toothed link plate (white circle) with the chromium coating film has a small torque resistance value at all rotation speeds, and in particular, has a large reduction rate at a low rotation speed, and a sliding resistance is reduced by up to 14%. That is, an effect on a low speed side in which the lubricating environment becomes stricter is improved.

Figure 8A:
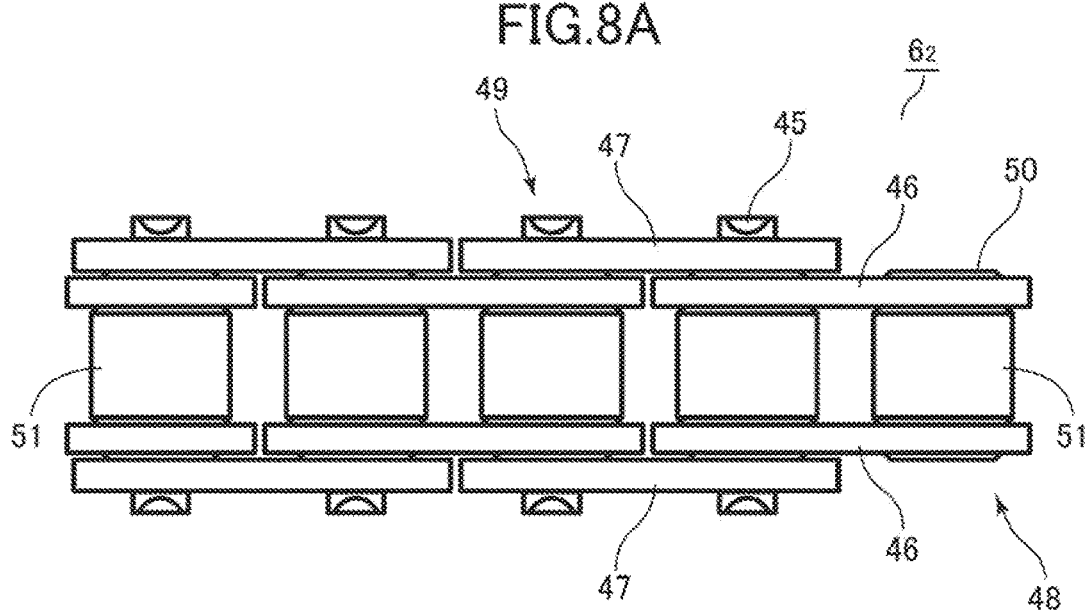
FIG. 8A is a plan view of a roller chain.
Figure 8B:
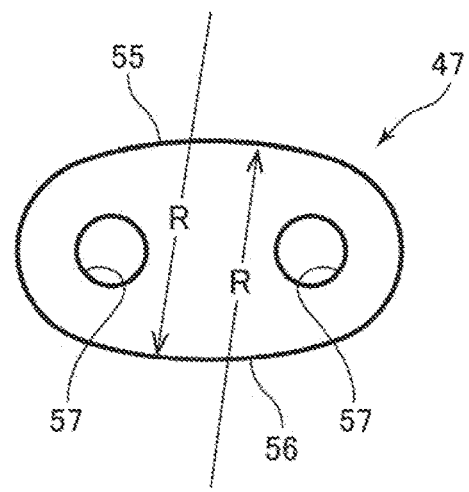
FIG. 8B is a front view showing an outer link plate of the roller chain of FIG. 8A.
Figure 8C:
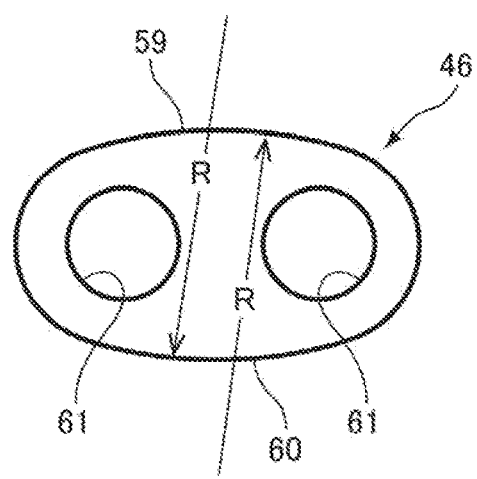
FIG. 8C is a front view showing an inner link plate of the roller chain of FIG. 8A.

Next, another embodiment will be described. In the present embodiment a roller chain is applied to the timing chain transmission device 1. As shown in FIG. 8A, a roller chain $6_2$ includes an outer (pin) link 49 in which both end portions of a pair of outer link plates 47 are connected by pins 45, and an inner (roller) link 48 in which both end portions of a pair of inner link plates 46 are coupled by bushings 50. Rollers 51 are loose-fitted to the bushings, and the inner link 48 and the outer link 49 are alternately coupled by fitting the pins 45 into the bushings 50 to form an endless shape. As shown in FIG. 8B, the outer link plate 47 is formed in an oval shape in a front view an upper surface 55 and a lower surface 56 are formed of convex portions in a round shape, and pin holes 57, 57 are formed at a predetermined interval (pitches). As shown in FIG. 8C, the inner link plate 46 is formed in an oval shape in a front view similarly to the outer link plate 47, an upper surface 59 and a lower surface 60 are formed in a round shape, and bush holes 61, 61 are formed at a predetermined interval (pitches).

The outer link plate 47 and the inner link plate 46 have the same shape except for the pin holes 57 and the bush holes 61, and the back surfaces (upper surfaces) 55, 59 of the respective link plates 47, 46 are in sliding contact with the chain guide. The back surfaces 55, 59 of the respective link plates 47, 46 are formed of convex portions in a round shape, and are in sliding contact with the chain guide at top portions of the convex portions which are center portions of the respective link plates in a longitudinal direction. Therefore, the roller chain $6_2$ according to the present embodiment also comes into sliding contact with the chain guide with a small area, similarly to the silent chain $6_1$ according to the previous embodiment. Sliding contact areas of top portions of the convex portions 55, 59 are 10% or less, preferably 5% or less, of overall areas of the link plates on the back surface side. Both surfaces of the outer link plate 47 and the inner link plate 46 of the roller chain $6_2$ are coated with chromium carbide by hard chromium plating or chromium diffusion processing (chromizing), and the coating film contains 10% or more of the chromium component. The roller chain $6_2$ is used under a lubricating environment with an engine oil mixed with a friction modifier made of a molybdenum compound such as MoDTC, which is similar to the previous embodiment. The roller chain $6_2$ is not limited to one row described above, and a plurality of rows of roller chains are similarly applicable. Further, a bushing chain in which rollers are omitted from a roller chain is similarly applicable. That is, in the invention, the roller chain is defined to include not only a roller chain in a narrow sense having rollers but also a bushing chain having no roller.

In the present embodiment, similarly to the previous embodiment, in a fluid lubrication region, a friction loss is reduced by the contact with the chain guide with a small area, and in a boundary lubrication region, the generation of $MoS_2$ of the friction modifier made of a molybdenum compound by the chromium coating film is promoted, so that the friction loss is reduced.

Even in the following embodiment, at least a back surface of a link plate in sliding contact with a chain guide is used under a lubricating environment of an engine oil in which a chromium-containing coating film is applied and a friction modifier made of a molybdenum compound such as MoDTC is mixed, and the same effects as those described above are obtained.

Figure 9A:
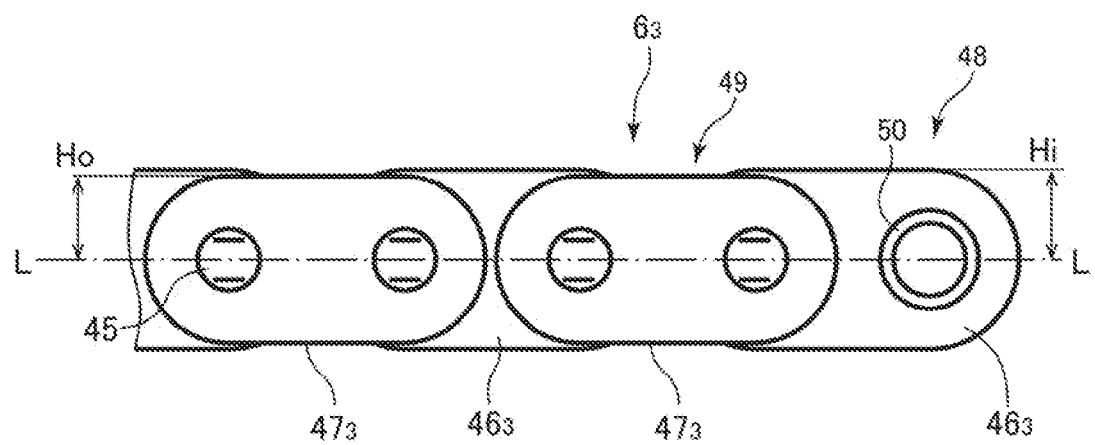
FIG. 9A is a front view showing another example of the roller chain.
Figure 9B:
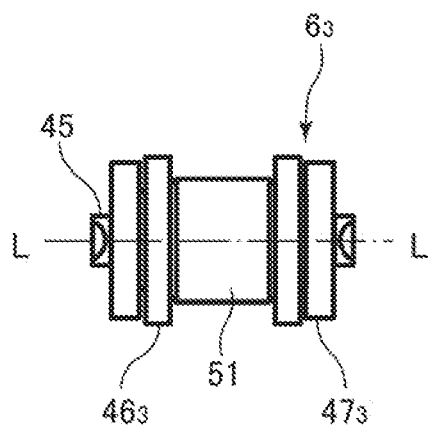
FIG. 9B is a side view of the roller chain of FIG. 9A.

FIGS. 9A and 9B show a roller chain according to a further modified embodiment. In a roller chain $6_3$, an outer link plate $47_3$ and an inner link plate $46_3$ have different dimensions in a width direction. That is, heights from the pitch line L-L of the roller chain to back surfaces of the plates are different from each other. In the present embodiment, the height (second height) Hi of the inner link plate $46_3$ is larger than a height (first height) Ho of the outer link plate $47_3$ (Hi>Ho). As a result, the roller chain $6_3$ travels while only the back surface of the inner link plate $46_3$ is in sliding contact with the chain guide, and the back surface of the outer link plate $47_3$ is not in contact with the chain guide. Thus, a contact area with the chain guide is correspondingly reduced. In the present embodiment, the back surface height (second height) Hi of the inner link plate $46_3$ is larger than the height (first height) Ho of the outer link plate $47_3$ (Hi>Ho), and conversely, the height (first height) Ho of the outer link plate $47_3$ may be higher than the height (second height) Hi of the inner link plate $46_3$ (Ho>Hi).

In the present embodiment, an upper (back) surface and a lower surface of each of the inner link plate $46_3$ and the outer link plate $47_3$ are formed in a normal shape formed of a straight line, and the back surface of one of the link plates is in contact with the chain guide at a long contact area formed of the straight line. Alternatively, as shown in FIGS. 8A to 8C, the link plates may have another shape such as a shape of which the back surface is round or a gourd shape having a crotch portion at a center.

Figure 10A:
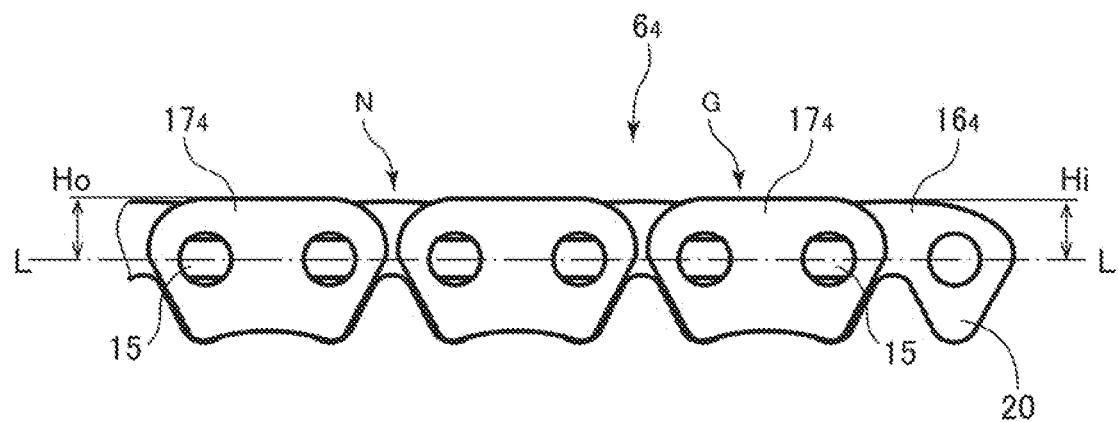
FIG. 10A is a front view showing another example of the silent chain.
Figure 10B:
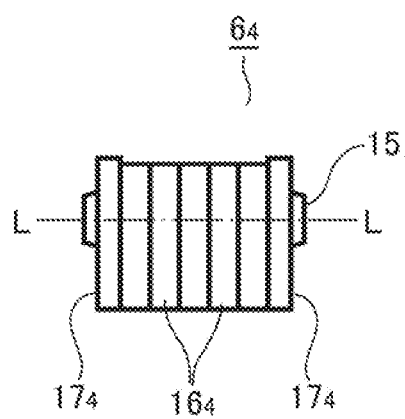
FIG. 10B is a side view of the silent chain of FIG. 10A.

FIGS. 10A and 10B show a silent chain according to further another embodiment. In a silent chain $6_4$, similarly to the previous roller chain, the back surface height Ho of a guide link plate $17_4$ is set to be higher than the back surface height Hi of a toothed link plate $16_4$ (Ho>Hi). As a result, in the silent chain $6_4$, only back surfaces of the two guide link plates $17_4$, $17_4$ are in sliding contact with a chain guide, and back surfaces of the multiple toothed link plates $16_4$ are not in contact with the chain guide. Thus, a contact area with the chain guide is correspondingly reduced.

In the present embodiment, the back surfaces of both the link plates $16_4$, $17_4$ are formed of a normal type link plate having a linear shape, and may be formed of a link plate having another shape such as an inner link plate having a round top portion with a small area or a guide link plate having a protruding ear portion as shown in FIGS. 2A to 3B.

Figure 11A:
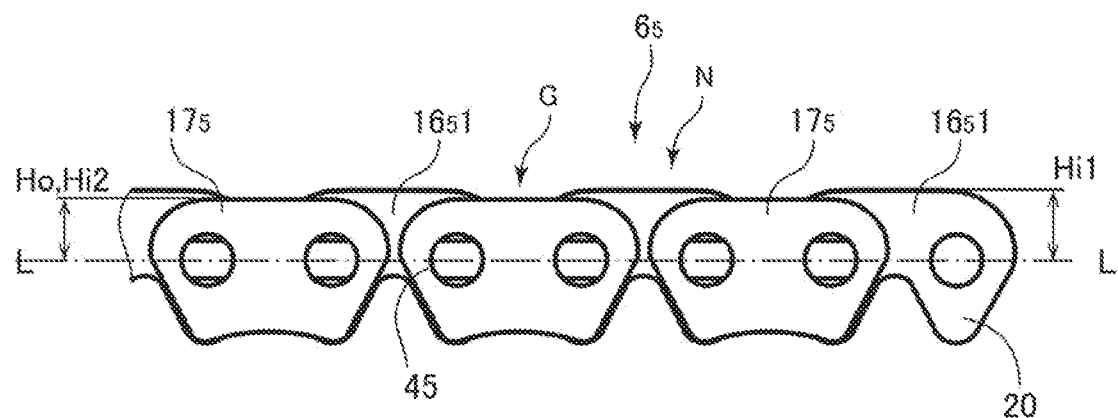
FIG. 11A is a front view showing another example of the silent chain.
Figure 11B:
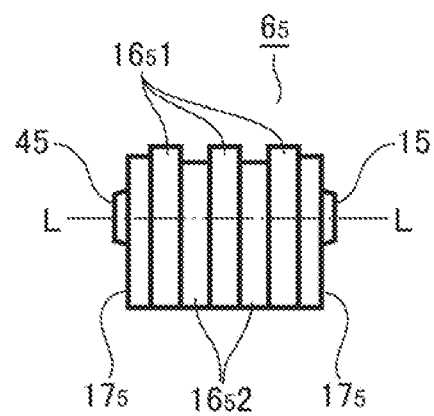
FIG. 11B is a side view of the silent chain of FIG. 11A.

FIGS. 11A and 11B show a silent chain according to further another embodiment. In a silent chain $6_5$, a guide link plate $17_5$ has the back surface height Ho, a toothed link plate includes low plates $16_52$ each having a height Hi2 the same as the back surface height Ho and high plates $16_51$ each having a back surface height Hi1 larger than the back surface height Ho, and the low plates $16_52$ and the high plates $16_51$ are alternately coupled (Hi1>Ho, Hi2). For example, the low plates $16_52$ each having the same height as the guide link plate $17_5$ are disposed in the guide row (outer link) G, and the high plates $16_51$ each higher than the guide link plate are disposed in the non-guide row (inner link) N. Therefore, in the silent chain $6_5$, only the high plates $16_51$ each having the high back surface height Hi1 among the toothed link plates are in sliding contact with the chain guide, and the low plates $16_52$ which are the other toothed lower link plates and each has the low back surface height Hi2 and the guide link plates $17_5$ having the back surface height Ho are not in contact with the chain guide, and a contact area with the chain guide is correspondingly reduced.

In the present embodiment, the guide link plates $17_5$ are of a normal type in which the back surface has a linear shape, and the toothed link plates are of a normal type in which the back surfaces of the low plates $16_52$ and the high plates $16_51$ each have a linear shape, and the inner link high plates $16_51$ each having the particularly high back surface height Hi1 each may have a small area such as a round shape shown in FIGS. 2A to 3B.

The chain in which the area of the link plate in contact with the chain guide is small is not limited to the embodiments described above, and the invention may include a chain in contact with the chain guide in an area of about 50% or less of a total area on a back surface side of a link plate. In addition, the invention is not limited to the timing chain transmission device, and can be applied to all chain transmission devices used in an engine, such as a balancer driving chain, and can be applied to all chain transmission devices without being limited to the chain in an engine.

The area of the link plate in sliding contact with the chain guide is a small area Since a friction loss in fluid lubrication is small and the area is small, there is a high possibility that the small area is in boundary lubrication. Even in this case, the friction modifier containing a molybdenum compound promotes formation of a molybdenum disulfide coating film by the chromium coating film of the link plate, so that an increase in the friction coefficient can be prevented and an increase in a friction loss can be prevented even when a low-viscosity lubricating oil is used.

When a silent chain including a guide link plate of a type having a low rigidity and an inner link plate of which a back surface is a convex portion in a round shape is applied, the top portion of the ear portion of the guide link plate and the top portion of the convex portion of the inner link plate are brought into sliding contact with the chain guide so that the silent chain can travel stably. At the same time, each of the top portion of the ear portion and the top portion of the convex portions of the link plates that are in sliding contact with the chain guide has an fairly small area of 10% or less of areas of the link plates on the back surface side, the friction loss in the fluid lubrication is significantly reduced, and a potential of becoming the boundary lubrication increases accordingly. However, the friction modifier containing a molybdenum compound cooperates with the chromium coating film of the link plate to prevent an increase in the friction coefficient in the boundary lubrication, so that the friction loss in an overall use state of the chain transmission device can be largely reduced.

In the silent chain, when at least one of the toothed link plate of the outer link and the toothed link plate of the inner link has a convex portion in a round shape on a back surface, the area in sliding contact with the chain guide can be reduced with a simple configuration.

Even when the invention is applied to a roller chain (including a bushing chain) in which a back surface of a link plate has a convex portion in a round shape, a top portion of the convex portion of the link plate that is in sliding contact with the chain guide has a small area of 10% or less of an area of the link plate on a back surface side, and as described above, friction in the overall use state of the chain transmission device can be significantly reduced.

One of the inner link plate and the outer link plate of the roller chain or only the guide link plate of the silent chain, or only a part of the inner link plate of the chain guide is in sliding contact with the chain guide, so that the sliding contact area with the chain guide can be reduced.

When the chromium coating film of the link plate has a hardness of 600 [Hv] or more, and a thickness of 3 [μm] or more, it is possible to reliably and stably promote the formation of the molybdenum disulfide coating film and reduce the friction coefficient by the friction modifier made of a molybdenum compound.

When the surface roughness of the coating film is Ra 0.5 or less, it is possible to stably prevent an increase in the friction loss in the boundary lubrication.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The invention is applicable for use in a chain transmission device.

What is claimed is:
1. A chain transmission device including:
a chain; and
a plurality of sprockets,
wherein:
the chain is wound around the plurality of sprockets under a lubrication environment;
the chain includes outer links, inner links and pins;

each of the outer links includes outer link plates fitted to the pins without rotating relative to the pins and the inner links;

each of the inner links includes inner link plates fitted to the pins and being rotatable relative to the pins;

the outer links and the inner links are alternately coupled in an endless manner;

back surfaces of the outer link plates and back surfaces of the inner link plates are configured to be guided by being in sliding contact with a chain guide;

in the lubrication environment, a friction modifier containing a molybdenum compound is included with a lubrication oil;

an area of each of the outer link plates configured to be in sliding contact with the chain guide is 50% or less of an overall area of one of the outer link plates on a rear surface side; and an area of each of the inner link plates configured to be in sliding contact with the chain guide is 50% or less of an overall area of one of the inner link plates on a rear surface side;

at least a slidable contact portion of each of the outer link plates and the inner link plates configured to be in sliding contact with the chain guide has a coating film containing 10% or more of a chromium component;

the molybdenum compound is configured to: (i) be decomposed by sliding heat generation when the area of each of the outer link plates or the area of each of the inner link plates comes into sliding contact with the chain guide; and (ii) generate sulfated molybdenum radicals in a boundary lubrication region; and the chromium component of the coating film is configured to bind with oxygen of the sulfated molybdenum radicals and promote generation of molybdenum disulfide between the area of each of the outer link plates or the area of each of the inner link plates and the chain guide in the boundary lubrication region.

2. The chain transmission device according to claim 1, wherein:

each of the outer link plates is a guide link plate to which two of the pins are fixed, and each of the outer links further includes an outer toothed link plate disposed in the same row as the guide link plate and having a pair of teeth on an inner diameter side;

each of the inner link plates is an inner toothed link plate rotatably coupled to two of the pins and having a pair of teeth on an inner diameter side; and the chain is a silent chain.

3. The chain transmission device according to claim 1, wherein:

two of the pins are fixed to each of the outer link plates;

two bushings are fixed to each of the inner link plates; and the chain is a roller chain in which the pins are fitted into the bushings, respectively.

4. The chain transmission device according to claim 2, wherein:

the guide link plate includes a crotch portion on a back surface side and an ear portion on each side of the crotch portion in a longitudinal direction;

a back surface of each of the outer toothed link plate and the inner toothed link plate includes a convex portion in a round shape; and each of a top portion of the ear portion of the guide link plate and a top portion of the convex portion of the outer toothed link plate or a top portion of the convex portion of the inner toothed link plate defines the area configured to be in sliding contact with the chain guide.

5. The chain transmission device according to claim 2, wherein:

at least one of the outer toothed link plate or the inner toothed link plate has a convex portion in a round shape on a back surface thereof; and a top portion of the convex portion of the at least one of the outer toothed link plate or the inner toothed link plate defines the area configured to be in sliding contact with the chain guide.

6. The chain transmission device according to claim 3, wherein:

the outer link plate has a convex portion in a round shape on a back surface thereof;

the inner link plate has a convex portion in a round shape on a back surface thereof; and each of a top portion of the convex portion of the outer link plate and a top portion of the convex portion of the inner link plate defines the area configured to be in sliding contact with the chain guide.

7. The chain transmission device according to claim 3, wherein:

the outer link plate has a first height from a pitch line thereof to a back surface thereof;

the inner link plate has a second height from a pitch line thereof to a back surface thereof; and the first height of the outer link plate is larger than the second height of the inner link plate, and only the outer link plate defines the area configured to be in sliding contact with the chain guide.

8. The chain transmission device according to claim 2, wherein:

the guide link plate has a height from a pitch line thereof to a back surface thereof;

the outer toothed link plate has a height from a pitch line thereof to a back surface thereof;

the inner toothed link plate has a height from a pitch line thereof to a back surface thereof;

the height of the outer toothed link plate is the same as the height of the inner toothed link plate; and a height of the guide link plate is larger than the height of the outer toothed link plate and the height of the inner toothed link plate, and only the guide link plate defines the area configured to be in sliding contact with the chain guide.

9. The chain transmission device according to claim 2, wherein:

the guide link plate has a height from a pitch line thereof to a back surface thereof;

the outer toothed link plate has a height from a pitch line thereof to a back surface thereof;

the inner toothed link plate has a height from a pitch line thereof to a back surface thereof;

the height of the outer toothed link plate is higher than the height of the inner toothed link plate and the height of the guide link plate; and only the outer toothed link plate defines the area configured to be in sliding contact with the chain guide.

10. The chain transmission device according to claim 1, wherein a hardness of the coating film is 600 Hv or more, and a thickness of the coating film is 3 µm or more.

11. The chain transmission device according to claim 1, wherein a surface roughness of the coating film is Ra 0.5 or less.

12. The chain transmission device according to claim 3, wherein:

the outer link plate has a first height from a pitch line thereof to a back surface thereof;

the inner link plate has a second height from a pitch line thereof to a back surface thereof; and the second height of the inner link plate is larger than the first height of the outer link plate, and only the inner link plate defines the area configured to be in sliding contact with the chain guide.

13. The chain transmission device according to claim 2, wherein:

the guide link plate has a height from a pitch line thereof to a back surface thereof;

the outer toothed link plate has a height from a pitch line thereof to a back surface thereof;

the inner toothed link plate has a height from a pitch line thereof to a back surface thereof;

the height of the inner toothed link plate is higher than the height of the outer toothed link plate and the height of the guide link plate; and only the inner toothed link plate defines the area configured to be in sliding contact with the chain guide.

\* \* \* \* \*